INVENTOR
CALVIN J. WERNER
his ATTORNEYS

Patented Oct. 28, 1952

2,615,315

UNITED STATES PATENT OFFICE 2,615,315

ANTIBACKLASH DEVICE

Calvin J. Werner, Dayton, Ohio, assignor to General Motors Corporation, Detroit, Mich., a corporation of Delaware Application October 20, 1949, Serial No. 122,540

5 Claims. (Cl. 64—14)

This invention relates to an improved power transmitting mechanism consisting of rotatable driving and driven members.

It is among the objects of the present invention to provide an anti-back lash device between a rotating driver and its driven member whereby the driver and its driven member are held in constant operating engagement and any tendency of the driven member to over-run the turning of the driver is substantially eliminated.

More particularly it is among the objects of the present invention to provide an anti-back lash device between concentrically connected driving and driven elements which rotate but are adapted reciprocatively to actuate a driven mechanism, whereby, pounding between the said elements due to back lash upon reversal of the movements of the reciprocating mechanism is substantially eliminated.

Further objects and advantages of the present invention will be apparent from the following description, reference being had to the accompanying drawings wherein a preferred embodiment of the present invention is clearly shown.

Figure 1:
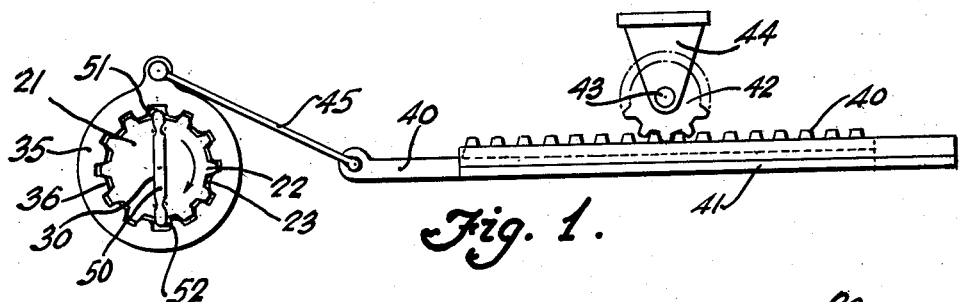
Fig. 1 is a view of a simplified drive mechanism to which the invention is applied.

Referring to the drawings, the Fig. 1 shows a simplified mechanism in which unidirectional rotation is translated into reciprocative motion, both linear and rotative. Such motions are used in churns, washing machines and many other mechanisms in which an electric motor 20 is generally used as the motive power. The motor shaft 21 has a splined area at its outer end, presenting, as clearly shown in the enlarged view Fig. 2, a plurality of equally spaced keys or teeth 22 and grooves 23. For purposes of this invention two diametrically opposite teeth are omitted thus providing open spaces 24 and 25 between teeth 22a—22b and 22c—22d respectively. A diametral groove or channel 30 is provided in the end surface of the drive shaft 21 opening centrally into the spaces 24 and 25.

The driven member 35 is in the form of an internal ring gear having teeth 36 each of which is adapted to extend into a groove 23 in the splined portion of the drive shaft 21 and thereby mechanically connecting the drive shaft 21 with the driven member 35 so that the latter is rotated by the former.

The mechanism to be reciprocated may be operatively connected to the driven member 35 in any suitable manner. In Fig. 1 there is shown a simplified form of mechanism reciprocated both linearly and rotatively by the driven member 35. Here a rack and pinion mechanism is illustrated, the rack 40 being slidable back and forth in a guide-way 41. The rack 40 is operatively engaged by a pinion 42 mounted upon a shaft 43 journaled in the bearing bracket 44. The rack is operatively connected to the driven member 35 by a link 45.

Figure 2:
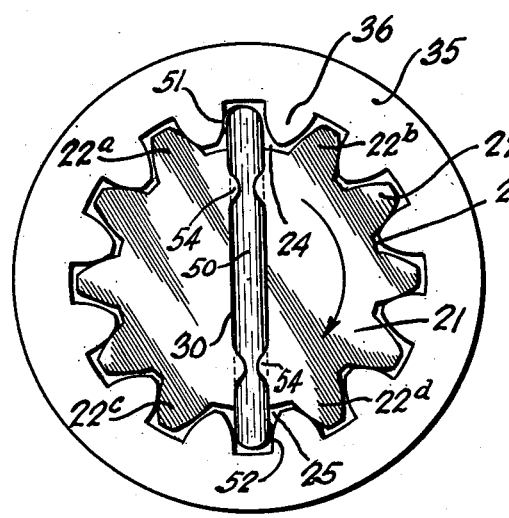
Fig. 2 is a detail end view of concentrically arranged driver and driven elements equipped with the anti-back lash device.
Figure 3:
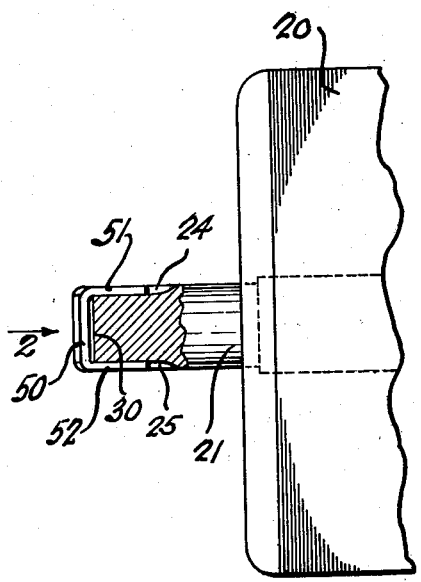
Fig. 3 shows the end of a motor shaft with the anti-back lash device applied thereto.

Assuming that the motor driven shaft 21 is being rotated clockwise as regards Figs. 1 and 2, the front faces of the teeth 22 on shaft 21 will engage the rear faces of the teeth 36 on the driven member 35 and thus rotate said member clockwise. While teeth 22 on the shaft are exerting the turning effort upon the teeth 36 of the driven member, a clearance space between the rear face and front face of adjacent teeth 22 and 36 respectively, will obtain. As the clockwise rotating driven member 35 makes one fourth of a revolution from the position shown in Fig. 1, its connection with rack 40 by means of link 45 will cause said rack to be moved to the right in guideway 41. During this time pinion 42, meshing with the rack 40, will be rotated counterclockwise.

As soon as the one-fourth or 90° revolution clockwise of member 35 is completed, the linear reciprocation of the rack 45 and consequently the rotation counterclockwise of pinion 42 stops completely. Continued rotation clockwise of the driven member 35 beyond its horizontal center Fig. 1, will move the rack 40 to the left and cause the pinion 42 to rotate clockwise. This sudden reversal in the direction of movements of the rack and pinion and especially if the rack or pinion moves a load, will cause a back-lash between the driving and driven members 22 and 35 respectively, the resulting pounding effect not only being noisy but also destructive where a slight clearance is normally provided between adjacent teeth 22 and 36.

The present invention provides a simple backlash take-up device which, under normal load conditions as mentioned, will maintain the two members 21 and 35 in substantially constant power transmitting engagement by resisting the counter-rotation of said members when the direction of movement of the driven, loaded mechanism is suddenly reversed, and thereby eliminates the destructive and noisy pounding effect resulting when no such provision is made.

Figure 4:
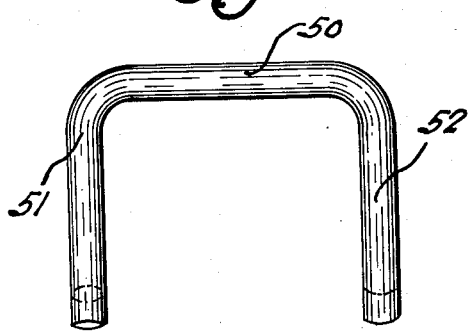
Fig. 4 is a side view of the anti-back lash element.
Figure 5:
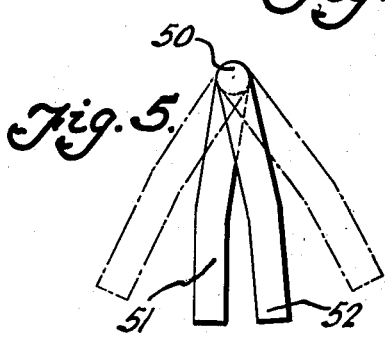
Fig. 5 is an end view of the element shown in Fig. 4.

This simple anti-back lash or take-up device comprises a spring rod or bar shown in the form of an inverted U in Fig. 4 and comprising a central cross-bar portion 50 and two integral, angular arm portions 51 and 52. The size of the bar portion 50 and the character of the metal from which it is made causes it to resist a predetermined torque. As shown in Fig. 5, the arms 51 and 52 of the U-shaped element when said element is viewed endwise, are not in alignment but normally lie on opposite sides of a plane passing through the axis of the cross-bar portion 50. Under certain conditions they may be spread further apart, as shown by the dot and dash lines, than under other requirements at which time they will normally be closer to alignment as shown by the solid lines.

When assembling the take-up device into the proper position the arms 51 and 52 are urged toward alignment as regards Fig. 5 so that each arm may be inserted into an opening 24 and 25 respectively. Twisting the arms into alignment for such insertion puts the cross-bar portion 50 under torsional tension so that when the take-up device is completely inserted into position in which the cross-bar portion is nested in the diametral slot 30, arms 51 and 52 are biased against adjacent teeth 36 of the member 35. This tendency of the take-up device to rotate the driven member 35 relatively to the driving member 21 in a direction counter to the rotation of said member 21 will maintain the rear faces of teeth 36 in operative engagement with the front faces of teeth 27. Small areas of the shaft 21 along the edges of the diametral channel 30 are peened over the rod portion 50 as at 54, thereby locking the take-up device in position.

The take-up device is designed to provide predetermined torsional resistance so that under normal conditions the recurrent sudden reversal of the driven loaded mechanism movements will not cause a back lash between members 21 and 35, but on the contrary member 36 will be maintained in constant operative engagement with member 21. If, due to abnormal circumstances, the load conditions should become excessive and cause relative movement between members 21 and 36, then the take-up device would act as a shock absorber, minimizing any pounding effect caused by the back lash.

Thus it may be seen that the present anti-back lash or take-up device is a simple and inexpensive means of eliminating destructive back-lash between a driving and a driven member operating under normal circumstances, said device acting as a cushion or shock absorber capable of minimizing pounding should it occur during abnormal operation.

While the embodiment of the present invention as herein disclosed, constitutes a preferred form, it is to be understood that other forms might be adopted, all coming within the scope of the claims which follow.

What is claimed is as follows:

1. In a device of the character described, the combination with a driving member, of a driven member mechanically engaged by the driving member; a take-up device interposed between said members, said take-up device comprising an element having a torque resisting body portion and two angular arm portions, said body portion resting in a groove in one of said members, each arm portion extending into and engaging one side of a groove in the other of said members and constantly urging said members against each other in a direction opposite that in which the driving member rotates the driven member.

2. In combination with two concentric members in mechanical engagement so that one rotates the other, the one member having a diametral slot in its one surface, the other member having grooves in the surface contiguous to said one member; a take-up device consisting of a torque resisting body portion having an angular arm at each end thereof, the body portion fitting into the diametral slot of the one member, each arm being biased to extend into a groove in the other member whereby the body portion is torsionally strained and maintains each arm portion in engagement with one side of its respective groove so that the said other member is yieldably urged in a direction opposite the rotation of the said one member.

3. In combination with two concentric members one being exteriorly splined and operatively engaging the interiorly splined portion of the other whereby the one may rotate the other, two diametrically opposite key portions of the exteriorly splined member being omitted so as to provide two spaces between the two members not occupied by an extending key portion and a diametral slot in the exteriorly splined member; of a torsion exerting means comprising a torsion resisting body portion fitting in the diametral slot, said body portion having an integral, angular arm at each end thereof, which, when biased to extend into a respective space between the two members, stresses the body portion so that each arm is yieldably maintained in engagement with the adjacent key in the interiorly splined member, whereby said member is yieldably, constantly urged in a direction counter to the rotation of the exteriorly splined member.

4. In combination with two concentric members operatively connected together by internal and externally splined portions on the respective members, two diametrically opposite keys on the exteriorly splined member being omitted to provide two unoccupied, open spaces longitudinally between said members and a transverse slot in the exteriorly splined member; of a torsion device operative to prevent back-lash between said two members, said device consisting of a main body portion fitting into the slot and having an integral, angular arm at each end, bent one to one side and the other to the other side of a plane passing through the axis of the torsion device, each arm being biased to extend into one of said open spaces whereby said torsion device exerts a constant rotative force upon the interiorly splined member tending to maintain it in constant operative engagement with the exteriorly splined member.

5. In combination with two concentric members operatively connected by an external spline on one and an internal splined portion on the other member, two diametrically opposite keys on the externally splined member being omitted to provide spaces between said members and a diametral slot in the end of the externally splined member; of an arch-shaped torsion element having a torque resisting cross-bar portion with an integral, angular arm portion at each end; said arms being disaligned normally, the cross-bar portion of the torsion element fitting into the diametral slot and the arms biased so that each extends into one of the respective spaces and thus tensions the cross-portion yieldably to maintain each arm in contact with a key in the internally splined member and thereby urge said members into contact operative engagement.

CALVIN J. WERNER.

REFERENCES CITED

The following references are of record in the file of this patent:

UNITED STATES PATENTS

| Number | Name | Date |
| --- | --- | --- |
| 2,319,784 | Backus | May 25, 1943 |
| 2,439,479 | Mackmann | Apr. 13, 1948 |